(12) United States Patent  
Cho et al.

(10) Patent No.: US 9,850,985 B2  
(45) Date of Patent: Dec. 26, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Seong Wook Hwang, Gunpo-si (KR); Hyun Sik Kwon, Seoul (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/178,369

(22) Filed: Jun. 9, 2016

(65) Prior Publication Data

US 2017/0159756 A1 Jun. 8, 2017

(30) Foreign Application Priority Data

Dec. 2, 2015 (KR) .................. 10-2015-0171009

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC combination set(s) only.
See application file for complete search history.

(56) References Cited

U.S. PATENT DOCUMENTS

| 8,663,056 | B2* | 3/2014 | Gumpoltsberger | ....... F16H 3/66 |
| | | | | 475/276 |
| 9,518,638 | B2* | 12/2016 | Muller | ...... F16H 3/66 |
| 9,546,714 | B2* | 1/2017 | Kook | ......... F16H 3/66 |
| 2015/0141195 | A1 | 5/2015 | Beck et al. | |

FOREIGN PATENT DOCUMENTS

JP 2015-059619 A 3/2015

* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements selectively connecting the rotation elements, or selectively connecting at least one rotation element and a transmission housing.

10 Claims, 2 Drawing Sheets

FIG. 2

| Speed stage | C1 | C2 | C3 | B1 | B2 | B3 | Gear ratio |
|---|---|---|---|---|---|---|---|
| D1 |  |  |  | ● |  | ● | 5.670 |
| D2 |  |  | ● |  |  | ● | 3.300 |
| D3 |  |  | ● | ● |  |  | 2.303 |
| D4 | ● |  | ● |  | ● |  | 1.622 |
| D5 | ● |  | ● |  |  |  | 1.207 |
| D6 |  | ● | ● |  |  |  | 1.000 |
| D7 |  | ● |  |  |  |  | 0.858 |
| D8 |  | ● |  |  | ● |  | 0.730 |
| D9 |  | ● |  | ● |  |  | 0.647 |
| REV | ● |  |  |  |  | ● | 4.885 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0171009, filed Dec. 2, 2015, the entire contents of which is incorporated herein for all purposes by this reference.

BACKGROUND OF THE INVENTION

Field of the Invention

The present invention relates to a planetary gear train of an automatic transmission for a vehicle. More particularly, the present invention relates to a planetary gear train of an automatic transmission for a vehicle which improves power delivery performance and fuel efficiency according to multiple speed stages as a consequence of achieving nine forward speed stages using a minimum number of constituent elements and improving silent driving by using driving point in a low engine speed.

Description of Related Art

The recent increase in oil prices has caused car makers to meet global demands for improving fuel efficiency. As a result, research is being conducted on engines in terms of reducing weight and improving fuel efficiency by downsizing, and research is also being conducted to ensure both drivability and competitiveness for maximizing fuel efficiency by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

In this aspect, in recent years, a transmission capable of achieving more than 8-speeds tends to be implemented and is mounted on the vehicles, and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which improves power delivery performance and fuel efficiency according to multi steps as a consequence of achieving nine forward speed stages and one reverse speed stage using a minimum number of constituent elements and improving silent driving by using driving point in a low engine speed.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements selectively connecting the rotation elements, or selectively connecting at least one rotation element and a transmission housing, in which the planetary gear train of the automatic transmission for the vehicle further comprises a first rotation shaft including the first rotation element and directly connected to the transmission housing, a second rotation shaft including the second rotation element and the fifth rotation element and selectively connected to the transmission housing, a third rotation shaft including the third rotation element and selectively connected to the input shaft, a fourth rotation shaft including the fourth rotation element and directly connected to the input shaft, a fifth rotation shaft including the sixth rotation element and the seventh rotation element and selectively connected to the transmission housing, a sixth rotation shaft including the eighth rotation element and the twelfth rotation element and selectively connected to the input shaft and the transmission housing, a seventh rotation shaft including the ninth rotation element and the eleventh rotation element and directly connected to the output shaft, and an eighth rotation shaft including the tenth rotation element and selectively connected to the input shaft.

The first planetary gear set may be a single pinion planetary gear set and include a first sun gear that is the first rotation element, a first planet carrier that is the second rotation element, and a first ring gear that is the third rotation element, the second planetary gear set may be a single pinion planetary gear set and include a second sun gear that is the fourth rotation element, a second planet carrier that is the fifth rotation element, and a second ring gear that is the sixth rotation element, the third planetary gear set may be a single pinion planetary gear set and include a third sun gear that is the seventh rotation element, a third planet carrier that is the eighth rotation element, and a third ring gear that is the ninth rotation element, and the fourth planetary gear set may be a single pinion planetary gear set and include a fourth sun gear that is the tenth rotation element, a fourth planet carrier that is the eleventh rotation element, and a fourth ring gear that is the twelfth rotation element.

The six friction elements include a first clutch selectively connecting the input shaft and the third rotation shaft, a second clutch selectively connecting the input shaft and the sixth rotation shaft, a third clutch selectively connecting the input shaft and the eighth rotation shaft, a first brake selectively connecting the second rotation shaft and the transmission housing, a second brake selectively connecting the fifth rotation shaft and the transmission housing, and a third brake selectively connecting the sixth rotation shaft and the transmission housing.

Speed stages achieved by selective operation of two friction elements among the six friction elements may include a first forward speed stage achieved by simultaneous operation of the first and third brakes, a second forward speed stage achieved by simultaneous operation of the third clutch and the third brake, a third forward speed stage achieved by simultaneous operation of the third clutch and the first brake, a fourth forward speed stage achieved by simultaneous operation of the third clutch and the second brake, a fifth forward speed stage achieved by simultaneous operation of the first and third clutches, a sixth forward speed stage achieved by simultaneous operation of the second and third clutches, a seventh forward speed stage achieved by simultaneous operation of the first and second clutches, an eighth forward speed stage achieved by simultaneous operation of the second clutch and the second brake, a ninth forward speed stage achieved by simultaneous operation of the second clutch and the first brake, and a reverse speed stage achieved by simultaneous operation of the first clutch and the third brake.

According to various aspects of the present invention, a planetary gear train of an automatic transmission for a vehicle may include an input shaft receiving torque of an engine, an output shaft outputting changed torque, a first planetary gear set being a single pinion planetary gear set and including first, second, and third rotation elements, a second planetary gear set being a single pinion planetary gear set and including fourth, fifth, and sixth rotation elements, a third planetary gear set being a single pinion planetary gear set and including seventh, eighth, and ninth rotation elements, a fourth planetary gear set being a single pinion planetary gear set and including tenth, eleventh, and twelfth rotation elements, a first rotation shaft including the first rotation element and directly connected to a transmission housing, a second rotation shaft including the second rotation element and the fifth rotation element and selectively connected to the transmission housing, a third rotation shaft including the third rotation element and selectively connected to the input shaft, a fourth rotation shaft including the fourth rotation element and directly connected to the input shaft, a fifth rotation shaft including the sixth rotation element and the seventh rotation element and selectively connected to the transmission housing, a sixth rotation shaft including the eighth rotation element and the twelfth rotation element and selectively connected to the input shaft and the transmission housing, a seventh rotation shaft including the ninth rotation element and the eleventh rotation element and directly connected to the output shaft, an eighth rotation shaft including the tenth rotation element and selectively connected to the input shaft, a first clutch selectively connecting the input shaft and the third rotation shaft, a second clutch selectively connecting the input shaft and the sixth rotation shaft, a third clutch selectively connecting the input shaft and the eighth rotation shaft, a first brake selectively connecting the second rotation shaft and the transmission housing, a second brake selectively connecting the fifth rotation shaft and the transmission housing, and a third brake selectively connecting the sixth rotation shaft and the transmission housing.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

According to various aspects of the present invention, a planetary gear train of an automatic transmission for a vehicle may include an input shaft receiving torque of an engine, an output shaft outputting changed torque of the engine, a first planetary gear set that is a single pinion planetary gear set and includes a first sun gear, a first planet carrier, and a first ring gear, a second planetary gear set that is a single pinion planetary gear set and includes a second sun gear, a second planet carrier, and a second ring gear, a third planetary gear set that is a single pinion planetary gear set and includes a third sun gear, a third planet carrier, and a third ring gear, and a fourth planetary gear set that is a single pinion planetary gear set and includes a fourth sun gear, a fourth planet carrier, and a fourth ring gear, in which the planetary gear train of the automatic transmission for the vehicle may further include a first rotation shaft including the first sun gear and directly connected to a transmission housing, a second rotation shaft including the first planet carrier and the second planet carrier and selectively connected to the transmission housing, a third rotation shaft including the first ring gear and selectively connected to the input shaft, a fourth rotation shaft including the second sun gear and directly connected to the input shaft, a fifth rotation shaft including the second ring gear and the third sun gear and selectively connected to the transmission housing, a sixth rotation shaft including the third planet carrier and the fourth ring gear and selectively connected to the input shaft and the transmission housing, a seventh rotation shaft including the third ring gear and the fourth planet carrier and directly connected to the output shaft, an eighth rotation shaft including the fourth sun gear and selectively connected to the input shaft, and six friction elements disposed to selectively connect the rotation shafts, or selectively connect at least one rotation shaft and the transmission housing.

A planetary gear train of an automatic transmission for a vehicle according to an exemplary embodiment of the present invention may achieve more than ten forward speed stages and one reverse speed stage by combining four planetary gear sets that are simple planetary gear sets with six friction elements.

Further, a planetary gear train of an automatic transmission for a vehicle according to an exemplary embodiment of the present invention may greatly improve silent driving by achieving adequate speed stage to rotation number of the engine through multiple speed stages of the automatic transmission.

Further, a planetary gear train of an automatic transmission for a vehicle an exemplary embodiment of the present invention may maximize the efficiency of the engine operation through high efficiency multiple speed stages, and improve power delivery performance and fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the planetary gear train according to an exemplary embodiment of the present invention.

Figure 1:
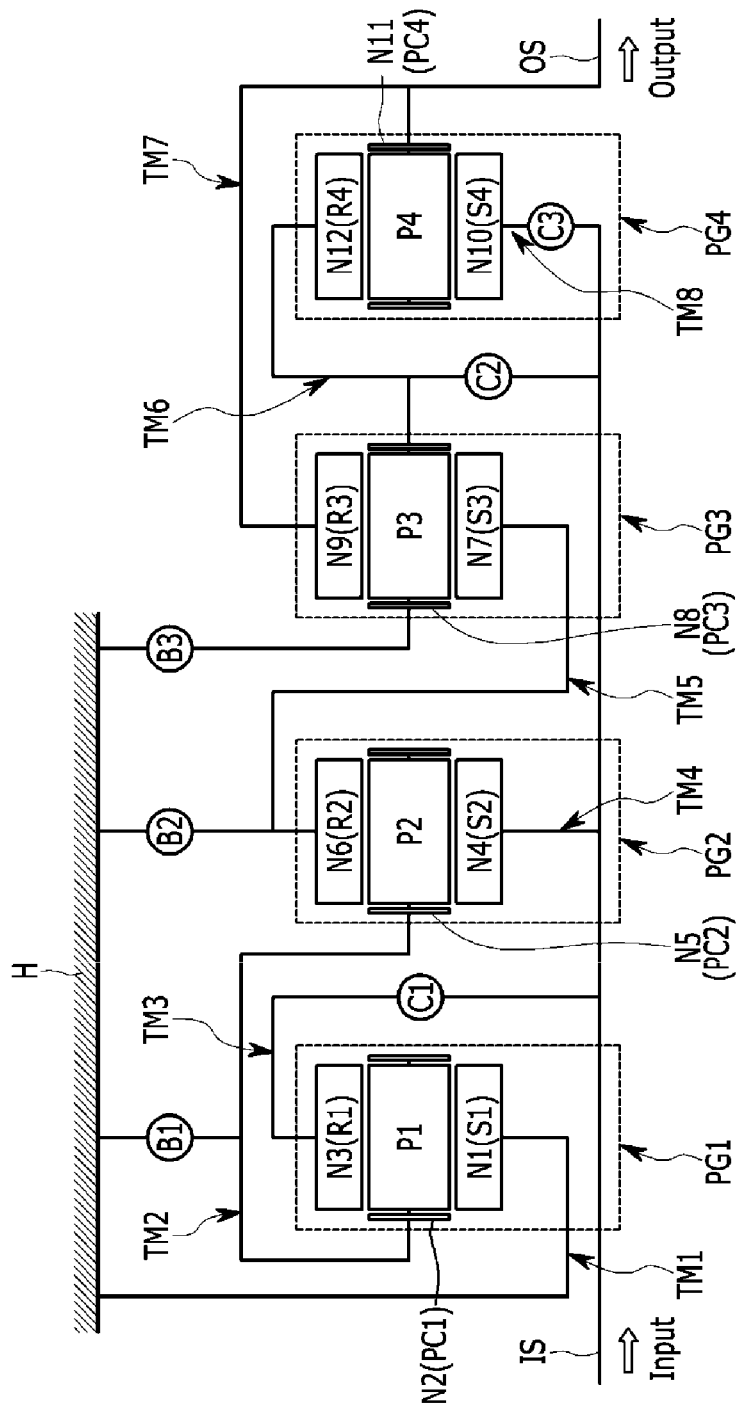
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention. Referring to FIG. 1, a planetary gear train according to various embodiments of the present invention includes first, second, third, fourth planetary gear sets PG1, PG2, PG3, and PG4 disposed on the same axis, an input shaft IS, an output shaft OS, eight rotations shafts TM1 to TM8 including at least one rotation elements of the first, second, third, and fourth planetary gear sets PG1, PG2, PG3, and PG4, six friction elements C1 to C3 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a first pinion P1 externally engaged the first sun gear S1, and a first ring gear R1 of a third rotation element N3 internally engaged with the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sungear S4, and a fourth ring gear R4 of a twelfth rotation element N12 internally engaged with the fourth pinion P4.

The second rotation element N2 is directly connected to the fifth rotation element N5, the sixth rotation element N6 is directly connected to the seventh rotation element N7, the eighth rotation element N8 is directly connected to the twelfth rotation element N12, the ninth rotation element N9 is directly connected to the eleventh rotation element N11, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 includes the first rotation element N1, and is directly connected to the transmission housing H so as to be always operated as a fixed element.

The second rotation shaft TM2 includes the second rotation element N2 and the fifth rotation element N5, and is selectively connected to the transmission housing H so as to be operated as a selective fixed element.

The third rotation shaft TM3 includes the third rotation element N3, and selectively connected to the input shaft IS so as to be operated as a selective input element.

The fourth rotation shaft TM4 includes the fourth rotation element N4, and is directly connected to the input shaft IS so as to be always operated as an input element.

The fifth rotation shaft TM5 includes the sixth rotation element N6, and is selectively connected to the second transmission housing H so as to be operated a selective element.

The sixth rotation shaft TM6 includes the eighth rotation element N8 and the twelfth rotation element N12, and is selectively connected to the input shaft IS so as to be operated as a selective input element and selectively connected to the transmission housing H so as to be operated as a selective fixed element.

The seventh rotation shaft TM7 includes the ninth rotation element N9 and the eleventh rotation element N11, and is directly connected to the output shaft OS so as to be always operated as an output element.

The eighth rotation shaft TM8 includes the tenth rotation element N10, and is selectively connected to the input shaft IS so as to be operated as an selective input element.

In addition, three clutches C1, C2, and C3 which are friction elements are disposed at connection portions between any two rotation shafts.

In addition, three brakes B1, B2, and B3 which are friction elements are disposed at connection portions between any one rotation shaft and the transmission housing H.

The six friction elements C1 to C3 and B1 to B3 will be described in further detail.

The first clutch C1 is disposed between the input shaft IS and the third rotation shaft TM3 and selectively connects the input shaft IS and the third rotation shaft TM3.

The second clutch C2 is disposed between the input shaft IS and the sixth rotation shaft TM6 and selectively connects the input shaft IS and the sixth rotation shaft TM6.

The third clutch C3 is disposed between the input shaft IS and the eighth rotation shaft TM8 and selectively connects the input shaft IS and the eighth rotation shaft TM8.

The first brake B1 is disposed between the second rotation shaft TM2 and the transmission housing H and causes the second rotation shaft TM2 so as to be operated as a selective fixed element.

The second brake B2 is disposed between the fifth rotation shaft TM5 and the transmission housing H and causes the fifth rotation shaft TM5 so as to be operated as a selective fixed element.

The third brake B3 is disposed between the sixth rotation shaft TM6 and the transmission housing H and causes the sixth rotation shaft TM6 so as to be operated as a selective fixed element.

The friction elements including the first, second, and third clutches C1, C2, and C3 and the first, second, and third brakes B1, B2, and B3 may be multi-plates friction elements of wet type that are operated by hydraulic pressure.

FIG. 2 is an operation chart of friction elements at each speed stage in the planetary gear train according to various embodiments of the present invention.

As shown in FIG. 2, two friction elements are operated at each speed stage in the planetary gear train according to various embodiments of the present invention. Shifting processes in the various embodiments of the present invention will be described in further detail.

The first and third brakes B1 and B3 are simultaneously operated at a first forward speed stage D1. According to this, torque input from the input shaft IS is input to the fourth rotation shaft TM4. As the first rotation shaft TM1 is operated as a fixed element, the third rotation shaft TM3 and the sixth rotation shaft TM6 are operated as fixed elements by the first brake B1 and the third brake B3, and torque input is changed by cooperation of the each rotation shaft to be a first forward speed stage and the changed torque is output through the output shaft OS including the seventh rotation shaft TM7.

The third clutch C3 and the third brake B3 are simultaneously operated at a second forward speed stage D2. According to this, as the eighth rotation shaft TM8 is connected to the input shaft IS by operation of the third clutch C3, torque of the input shaft IS is input to the fourth rotation shaft TM4 and the eighth rotation shaft TM8. Further, as the first rotation shaft TM1 is operated as a fixed element, the sixth rotation shaft TM6 is operated as a fixed element by the third brake B3, and torque input is changed by cooperation of the each rotation shaft to be a second forward speed stage and the changed torque is output through the output shaft OS including the seventh rotation shaft TM7.

The third clutch C3 and first brake B1 are simultaneously operated at a third forward speed stage D3. According to this, as the eighth rotation shaft TM8 is connected to the input shaft IS by operation of the third clutch C3, torque of the input shaft IS is input to the fourth rotation shaft TM4 and the eighth rotation shaft TM8. Further, as the first rotation shaft TM1 is operated as a fixed element, the second rotation shaft TM2 is operated as a fixed element by the first brake B1, and torque input is changed by cooperation of the each rotation shaft to be a third forward speed stage and the changed torque is output through the output shaft OS including the seventh rotation shaft TM7.

The third clutch C3 and second brake B2 are simultaneously operated at a fourth forward speed stage D4. According to this, as the eighth rotation shaft TM8 is connected to the input shaft IS by operation of the third clutch C3, torque of the input shaft IS is input to the fourth rotation shaft TM4 and the eighth rotation shaft TM8. Further, as the first rotation shaft TM1 is operated as a fixed element, the fifth rotation shaft TM5 is operated as a fixed element by the second brake B2, and torque input is changed by cooperation of the each rotation shaft to be a fourth forward speed stage and the changed torque is output through the output shaft OS including the seventh rotation shaft TM7.

The first clutch C1 and third clutch C3 are simultaneously operated at a fifth forward speed stage D5. According to this, as the third rotation shaft TM3 is connected to the input shaft IS by operation of the first clutch C1, and the eighth rotation shaft TM8 is connected to the input shaft IS by the third clutch C3, torque of the input shaft IS is input to the third, fourth, and eighth rotation shafts TM3, TM4 and TM8. Further, as the first rotation shaft TM1 is operated as a fixed element, and torque input is changed by cooperation of the each rotation shaft to be a fifth forward speed stage and the changed torque is output through the output shaft OS including the seventh rotation shaft TM7.

The second and third clutches C1 and C3 are simultaneously operated at a sixth forward speed stage D6. According to this, as the sixth rotation shaft TM6 is connected to the input shaft IS by operation of the second clutch C2, and the eighth rotation shaft TM8 is connected to the input shaft IS by the third clutch C3, torque of the input shaft IS is input to the fourth, sixth and eighth rotation shafts TM4, TM6 and TM8. Then, as the first rotation shaft TM1 is operated as a fixed element, and torque input is changed by cooperation of the each rotation shaft to be a sixth forward speed stage and the changed torque is output through the output shaft OS including the seventh rotation shaft TM7.

The first and second clutches C1 and C2 are simultaneously operated at a seventh forward speed stage D7. According to this, as the third rotation shaft TM3 is connected to the input shaft IS by operation of the first clutch C1, and the sixth rotation shaft TM6 is connected to the input shaft IS by the third clutch C3, torque of the input shaft IS is input to the third, fourth and sixth rotation shafts TM3, TM4 and TM6. Then, as the first rotation shaft TM1 is operated as a fixed element, and torque input is changed by cooperation of the each rotation shaft to be a seventh forward speed stage and the changed torque is output through the output shaft OS including the seventh rotation shaft TM7.

The second clutch C2 and the second brake B2 are simultaneously operated at an eighth forward speed stage D8. According to this, as the sixth rotation shaft TM6 is connected to the input shaft IS by operation of the second clutch C2, torque of the input shaft IS is input to the fourth and sixth rotation shafts TM4 and TM6. Then, as the first rotation shaft TM1 is operated as a fixed element, the fifth rotation shaft TM5 is operated as a fixed element by the second brake B2, and torque input is changed by cooperation of the each rotation shaft to be an eighth forward speed stage and the changed torque is output through the output shaft OS including the seventh rotation shaft TM7.

The second clutch C2 and the first brake B1 are simultaneously operated at a fifth forward speed stage D5. According to this, as the sixth rotation shaft TM6 is connected to the input shaft IS by operation of the second clutch C2, torque of the input shaft IS is input to the fourth and sixth rotation shafts TM4 and TM6. Then, as the first rotation shaft TM1 is operated as a fixed element, the second rotation shaft TM2 is operated as a fixed element by the first brake B1, and torque input is changed by cooperation of the each rotation shaft to be a ninth forward speed stage and the changed torque is output through the output shaft OS including the seventh rotation shaft TM7.

The first clutch C1 and the third brake B3 are simultaneously operated at a reverse speed stage REV. According to this, as the third rotation shaft TM3 is connected to the input shaft IS by operation of the first clutch C1, torque of the input shaft IS is input to the third and fourth rotation shafts TM3 and TM4. Then, as the first rotation shaft TM1 is operated as a fixed element, the sixth rotation shaft TM6 is operated as a fixed element by the third brake B3, and torque input is changed by cooperation of the each rotation shaft to be a reverse speed stage and the changed torque is output through the output shaft OS including the seventh rotation shaft TM7.

The planetary gear train according to various embodiments of the present invention may achieve at least nine forward speed stages and one reverse speed stage by controlling four planetary gear sets PG1, PG2, PG3, and PG4 with three clutches C1, C2, and C3 and three brakes B1, B2, and B3.

Further, a planetary gear train of an automatic transmission for a vehicle according to various embodiments of the present invention may greatly improve silent driving by achieving adequate speed stage to rotation number of the engine through multiple speed stages of the automatic transmission.

Further, a planetary gear train of an automatic transmission for a vehicle according to various embodiments of the present invention may maximize the efficiency of the engine operation through high efficiency multiple speed stages, and improve power delivery performance and fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements; and
   six friction elements disposed between at least one rotation element of the first to twelfth rotation elements and another rotation element of the first to twelfth rotation elements or the input shaft, or between at least one rotation element of the first to twelfth rotation elements and a transmission housing,
   wherein the planetary gear train of the automatic transmission for the vehicle further comprises:
   a first rotation shaft including the first rotation element and directly connected to the transmission housing;
   a second rotation shaft including the second rotation element and the fifth rotation element and selectively connected to the transmission housing;
   a third rotation shaft including the third rotation element and selectively connected to the input shaft;
   a fourth rotation shaft including the fourth rotation element and directly connected to the input shaft;
   a fifth rotation shaft including the sixth rotation element and the seventh rotation element and selectively connected to the transmission housing;
   a sixth rotation shaft including the eighth rotation element and the twelfth rotation element and selectively connected to the input shaft and the transmission housing;
   a seventh rotation shaft including the ninth rotation element and the eleventh rotation element and directly connected to the output shaft; and
   an eighth rotation shaft including the tenth rotation element and selectively connected to the input shaft.

2. The planetary gear train of claim 1, wherein:
   the first planetary gear set is a single pinion planetary gear set and includes a first sun gear that is the first rotation element, a first planet carrier that is the second rotation element, and a first ring gear that is the third rotation element;
   the second planetary gear set is a single pinion planetary gear set and includes a second sun gear that is the fourth rotation element, a second planet carrier that is the fifth rotation element, and a second ring gear that is the sixth rotation element;
   the third planetary gear set is a single pinion planetary gear set and includes a third sun gear that is the seventh rotation element, a third planet carrier that is the eighth rotation element, and a third ring gear that is the ninth rotation element; and
   the fourth planetary gear set is a single pinion planetary gear set and includes a fourth sun gear that is the tenth rotation element, a fourth planet carrier that is the eleventh rotation element, and a fourth ring gear that is the twelfth rotation element.

3. The planetary gear train of claim 1, wherein the six friction elements include:
   a first clutch selectively connecting the input shaft and the third rotation shaft;
   a second clutch selectively connecting the input shaft and the sixth rotation shaft;
   a third clutch selectively connecting the input shaft and the eighth rotation shaft;
   a first brake selectively connecting the second rotation shaft and the transmission housing;
   a second brake selectively connecting the fifth rotation shaft and the transmission housing; and
   a third brake selectively connecting the sixth rotation shaft and the transmission housing.

4. The planetary gear train of claim 3, wherein speed stages achieved by selective operation of two friction elements among the six friction elements include:
   a first forward speed stage achieved by simultaneous operation of the first and third brakes;
   a second forward speed stage achieved by simultaneous operation of the third clutch and the third brake;
   a third forward speed stage achieved by simultaneous operation of the third clutch and the first brake;
   a fourth forward speed stage achieved by simultaneous operation of the third clutch and the second brake;

a fifth forward speed stage achieved by simultaneous operation of the first and third clutches;
a sixth forward speed stage achieved by simultaneous operation of the second and third clutches;
a seventh forward speed stage achieved by simultaneous operation of the first and second clutches;
an eighth forward speed stage achieved by simultaneous operation of the second clutch and the second brake;
a ninth forward speed stage achieved by simultaneous operation of the second clutch and the first brake; and
a reverse speed stage achieved by simultaneous operation of the first clutch and the third brake.

5. A planetary gear train of an automatic transmission for a vehicle, comprising:
an input shaft receiving torque of an engine;
an output shaft outputting changed torque;
a first planetary gear set being a single pinion planetary gear set and including first, second, and third rotation elements;
a second planetary gear set being a single pinion planetary gear set and including fourth, fifth, and sixth rotation elements;
a third planetary gear set being a single pinion planetary gear set and including seventh, eighth, and ninth rotation elements;
a fourth planetary gear set being a single pinion planetary gear set and including tenth, eleventh, and twelfth rotation elements;
a first rotation shaft including the first rotation element and directly connected to a transmission housing;
a second rotation shaft including the second rotation element and the fifth rotation element and selectively connected to the transmission housing;
a third rotation shaft including the third rotation element and selectively connected to the input shaft;
a fourth rotation shaft including the fourth rotation element and directly connected to the input shaft;
a fifth rotation shaft including the sixth rotation element and the seventh rotation element and selectively connected to the transmission housing;
a sixth rotation shaft including the eighth rotation element and the twelfth rotation element and selectively connected to the input shaft and the transmission housing;
a seventh rotation shaft including the ninth rotation element and the eleventh rotation element and directly connected to the output shaft;
an eighth rotation shaft including the tenth rotation element and selectively connected to the input shaft;
a first clutch selectively connecting the input shaft and the third rotation shaft;
a second clutch selectively connecting the input shaft and the sixth rotation shaft;
a third clutch selectively connecting the input shaft and the eighth rotation shaft;
a first brake selectively connecting the second rotation shaft and the transmission housing;
a second brake selectively connecting the fifth rotation shaft and the transmission housing; and
a third brake selectively connecting the sixth rotation shaft and the transmission housing.

6. The planetary gear train of claim 5, wherein:
the first planetary gear set includes a first sun gear as the first rotation element, a first planet carrier as the second rotation element, and a first ring gear as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

7. The planetary gear train of claim 5, wherein speed stages achieved by selective operation of two friction elements among the six friction elements including the three clutches and the three brakes include:
a first forward speed stage achieved by simultaneous operation of the first and third brakes;
a second forward speed stage achieved by simultaneous operation of the third clutch and the third brake;
a third forward speed stage achieved by simultaneous operation of the third clutch and the first brake;
a fourth forward speed stage achieved by simultaneous operation of the third clutch and the second brake;
a fifth forward speed stage achieved by simultaneous operation of the first and third clutches;
a sixth forward speed stage achieved by simultaneous operation of the second and third clutches;
a seventh forward speed stage achieved by simultaneous operation of the first and second clutches;
an eighth forward speed stage achieved by simultaneous operation of the second clutch and the second brake;
a ninth forward speed stage achieved by simultaneous operation of the second clutch and the first brake; and
a reverse speed stage achieved by simultaneous operation of the first clutch and the third brake.

8. A planetary gear train of an automatic transmission for a vehicle, comprising:
an input shaft receiving torque of an engine;
an output shaft outputting changed torque of the engine;
a first planetary gear set that is a single pinion planetary gear set and includes a first sun gear, a first planet carrier, and a first ring gear;
a second planetary gear set that is a single pinion planetary gear set and includes a second sun gear, a second planet carrier, and a second ring gear;
a third planetary gear set that is a single pinion planetary gear set and includes a third sun gear, a third planet carrier, and a third ring gear; and
a fourth planetary gear set that is a single pinion planetary gear set and includes a fourth sun gear, a fourth planet carrier, and a fourth ring gear,
wherein the planetary gear train of the automatic transmission for the vehicle further comprises:
a first rotation shaft including the first sun gear and directly connected to a transmission housing;
a second rotation shaft including the first planet carrier and the second planet carrier and selectively connected to the transmission housing;
a third rotation shaft including the first ring gear and selectively connected to the input shaft;
a fourth rotation shaft including the second sun gear and directly connected to the input shaft;
a fifth rotation shaft including the second ring gear and the third sun gear and selectively connected to the transmission housing;

a sixth rotation shaft including the third planet carrier and the fourth ring gear and selectively connected to the input shaft and the transmission housing;

a seventh rotation shaft including the third ring gear and the fourth planet carrier and directly connected to the output shaft;

an eighth rotation shaft including the fourth sun gear and selectively connected to the input shaft; and six friction elements disposed between at least one rotation shaft of the first to eighth rotation shafts and another rotation shaft of the first to eighth rotation shafts or between at least one rotation shaft of the first to eighth rotation shafts and a transmission housing.

9. The planetary gear train of claim of claim 8, wherein the six friction elements comprise:

a first clutch selectively connecting the input shaft and the third rotation shaft;

a second clutch selectively connecting the input shaft and the sixth rotation shaft;

a third clutch selectively connecting the input shaft and the eighth rotation shaft;

a first brake selectively connecting the second rotation shaft and the transmission housing;

a second brake selectively connecting the fifth rotation shaft and the transmission housing; and a third brake selectively connecting the sixth rotation shaft and the transmission housing.

10. The planetary gear train of claim 9, wherein speed stages achieved by selective operation of two friction elements among the six friction elements include:

a first forward speed stage achieved by simultaneous operation of the first and third brakes;

a second forward speed stage achieved by simultaneous operation of the third clutch and the third brake;

a third forward speed stage achieved by simultaneous operation of the third clutch and the first brake;

a fourth forward speed stage achieved by simultaneous operation of the third clutch and the second brake;

a fifth forward speed stage achieved by simultaneous operation of the first and third clutches;

a sixth forward speed stage achieved by simultaneous operation of the second and third clutches;

a seventh forward speed stage achieved by simultaneous operation of the first and second clutches;

an eighth forward speed stage achieved by simultaneous operation of the second clutch and the second brake;

a ninth forward speed stage achieved by simultaneous operation of the second clutch and the first brake; and a reverse speed stage achieved by simultaneous operation of the first clutch and the third brake.

* * * * *